United States Patent

[11] 3,585,916

| | | | | | |
|---|---|---|---|---|---|
| [72] | Inventor | Karl Heinz Lange Bunde-Ennigloh, Germany | 1,061,115 | 5/1913 | Pickard .................... 95/39 |
| [21] | Appl. No. | 762,693 | 2,637,254 | 5/1953 | Faulhaber ................. 95/39 |
| [22] | Filed | Sept. 26, 1968 | 2,011,895 | 8/1935 | Goldhammer............... 95/53 |
| [45] | Patented | June 22, 1971 | 2,019,699 | 11/1935 | Green....................... 95/53 |
| [73] | Assignee | Balda Werke Photographische Gerate und Kunststoff, R. Gruter Kommanditgesellschaft Bunde, Westphalia, Germany | 2,117,972 | 5/1938 | Mihalyi .................... 95/53 |
| | | | 2,439,087 | 4/1948 | Harvey ..................... 95/53 |
| | | | 2,443,159 | 6/1948 | Fuerst ...................... 95/53 X |
| | | | 2,464,671 | 3/1949 | Castedello................. 95/53 |
| [32] | Priority | Oct. 17, 1967 | 2,478,394 | 8/1949 | Harvey ..................... 95/53 UX |
| [33] | | Germany | 2,541,413 | 2/1951 | Gorey....................... 95/53 |
| [31] | | P 15 97 126.3 | | | |

*Primary Examiner*—Samuel S. Matthews
*Assistant Examiner*—Monroe H. Hayes
*Attorney*—Sparrow and Sparrow

[54] CAMERA COMPRISING AN EXPOSURE RELEASE KEY
7 Claims, 21 Drawing Figs.

[52] U.S. Cl. ................................................ 95/39, 95/44, 95/53
[51] Int. Cl. .................................................. G03b 17/04
[50] Field of Search........................................... 95/53, 44, 45, 46, 39

[56] References Cited
UNITED STATES PATENTS
1,023,932  4/1912  Folmer.......................... 95/39

ABSTRACT: A camera is provided with a retractable cover and a retractable objective, and the construction comprises a slide movable perpendicularly with respect to the optical axis. The slide has two cams shifted against each other, one controlling the support of the objective, the other cam controlling in its shifted position in timed relation to the first cam a flat cover plate covering the objective in the retracted position.

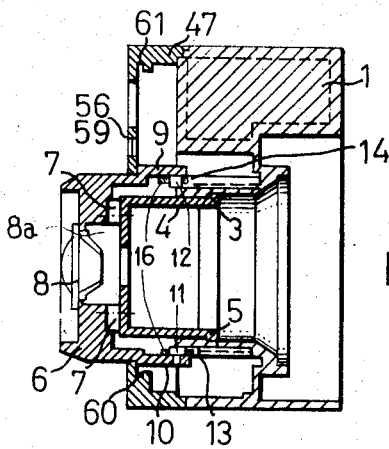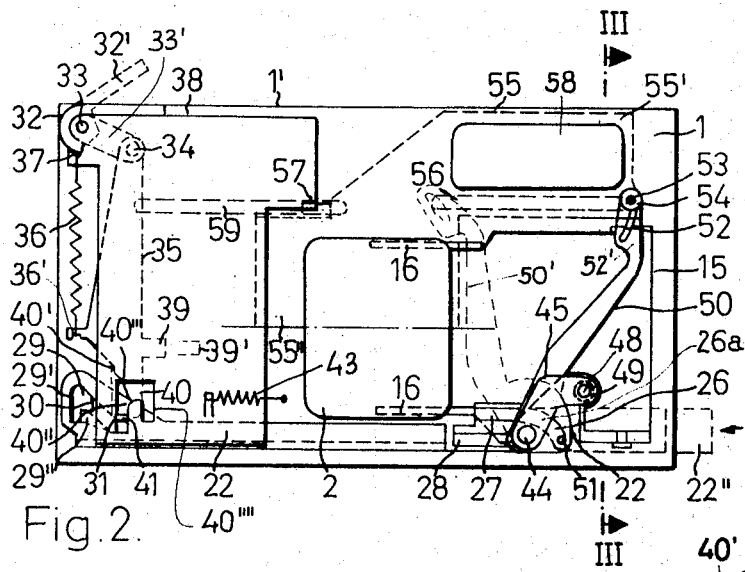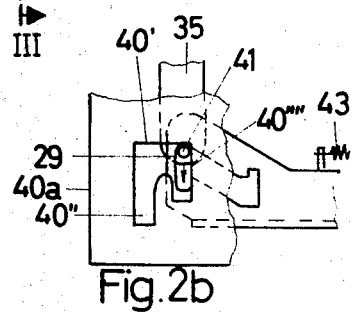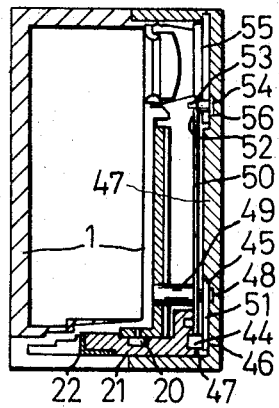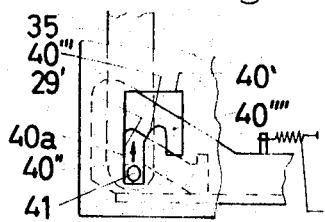

3,585,916

INVENTOR:
Karl Heinz Lange

By Sparrow and Sparrow
Attorneys 3,585,916

INVENTOR:
Karl Heinz Lange
By
Sparrow and Sparrow
Attorneys

3,585,916

CAMERA COMPRISING AN EXPOSURE RELEASE KEY

BACKGROUND OF THE INVENTION

Cameras are known which have a retractable objective tube support. In most cases they are constructed without a cover. Cameras with a bellows usually have a hinged cover which when not in use covers the objective support and is cumbersome because it must be swung to the outside. Moreover these constructions also take up rather much space, since the cover must have sufficient stability, obtained mostly by a convex and bulky construction.

SUMMARY

The invention solves the problem of providing a retractable, compact, and conveniently operable tube and a cover construction by providing a slide movable perpendicularly with respect to the optical axis. The slide has two controlling cams shifted against each other, one cam controlling the support of the objective cam, the other controlling in its shifted position in timed relation to the first cam a flat cover plate covering the objective in the retracted position. It is most advantageous to have the support of the objective and the slide with the cams engaged by the latter locked at a member connected with the exposure release key. In this state the connection between release key and exposure-releaser mechanism is disconnected so that no exposure release takes place when the key in the inoperable state is operated. At first only the support of the objective is moved into the operating position and only at the second and every further actuation of the release key an exposure release is performed.

BRIEF DESCRIPTION OF THE DRAWING

In the following description and in the claims, parts will be identified by specific names for convenience, but such names are intended to be as generic in their application to similar parts as the art will permit. Like reference characters denote like parts in the several figures of the drawings, in which FIG. 1 shows a vertical section of the camera in the area of the tube of the objective, FIG. 2 a front view of the camera after removing of the front plate and the tube of the objective, FIGS. 2a and 2b are details of FIG. 2 with varied positions of actuation parts, FIG. 3 is a vertical section of the camera along the line III–III of FIG. 2.

DESCRIPTION

Figure 4:
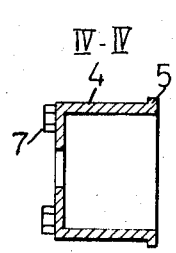
FIG. 4 is a length-section of the shifting tubus for the objective support.
Figure 5:
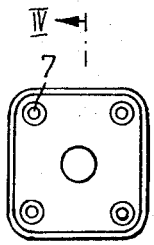
FIG. 5 is the front view of the tube shown in FIG. 4.
Figure 6:
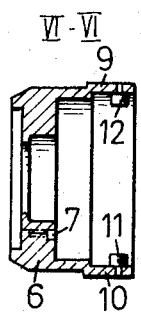
FIG. 6 is a longitudinal section of the support for the objective.
Figures 8, 9:
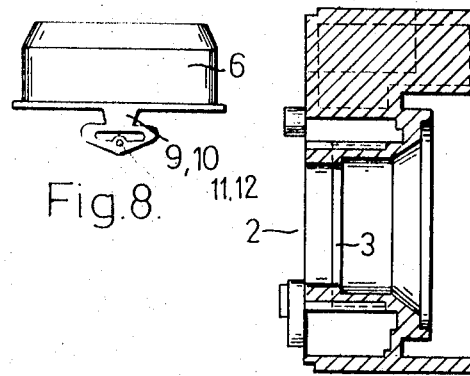
FIG. 8 is a plan view of the support of the objective.
FIG. 9 is a section of the camera with tube and support of the objective removed.
Figure 10:
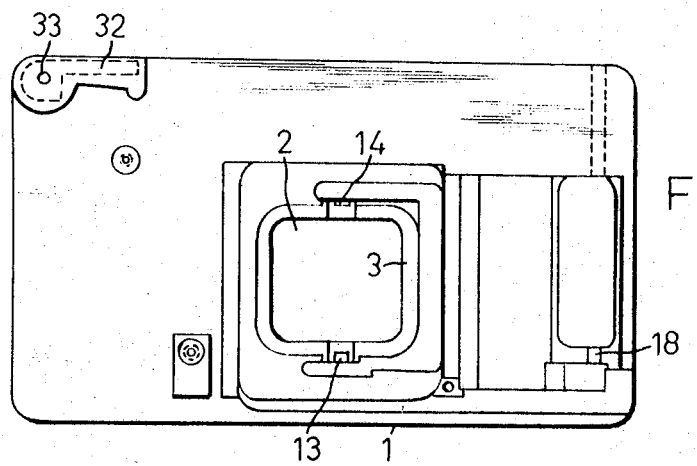
FIG. 10 is a front view of the device shown in FIG. 9.

In the drawing FIGS. 1 and 2, 1 is the camera housing, provided with an opening 2 of preferably rectangular or square shape with step 3 (FIG. 9). In the opening 2 is a support 6 for the objective 8 to which at points 7 a tube 4 is fixedly attached and which is shiftable in the direction of the optical axis. In the extended state the edge 5 of tube 4 is abutting against step 3 of the rectangular opening 2 and thus limits the movement of the support 6 of the objective 8 out of the interior of the camera (FIG. 1). In the space 8 a remaining between both parts the objective 8 and parts of the camera shutter and exposure release not shown in the drawing are arranged. Support 6 of objective 8 has protruding flanges 9 and 10 (FIGS. 1, 6, 8) at the rear end of the former to which the guide pins 11, 12 (FIG. 6) are preferably rigidly connected (riveted or by similar means). According to a feature of the invention support 6 of the objective 8 together with flanges 9 and 10 and guide pins 11, 12 may consist of a highly impact-resistant tough plastic moulding. It is advantageous for the purpose of tolerance-compensation to make flanges 9, 10 resilient in the structure as shown (FIG. 8).

Figure 11:
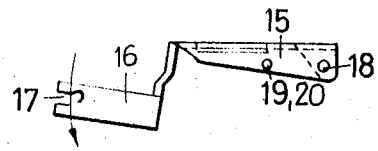
FIG. 11 is a side view of the rocking arm for the movement of the tube.
Figure 12:
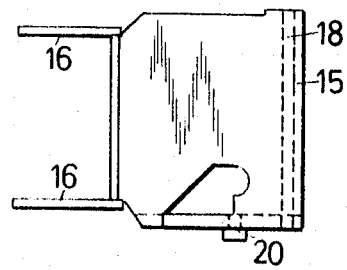
FIG. 12 is the front view of the device shown in FIG. 11.

Guide pins 11 and 12 are loosely guided in slots 13 and 14 of camera housing 1. Simultaneously support 6 of objective 8 and tube 4 bolted to the latter are engaged by pins 11 and 12 and are driven by a rocker 15 of tube 4 (FIGS. 11 and 12) by the arms 16 and corresponding slots 17 thereof.

Figure 15:
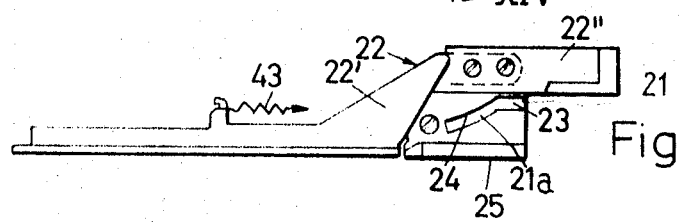
FIG. 15 is the plan view of the slider mechanism shown in FIG. 13.

Rocker 15 is pivoted by a hinge-pin 18 in housing 1. At the point 19 of rocker 15 a pin 20 engages cam 21 (FIG. 15) of a control slide 22 (FIG. 15).

Cam 21 extending in a horizontal plane on the inside of control slide 22 parallel to the optical axis of objective 8 consists of three parts:

1. A start section 23 not rising relative to the direction of movement of control slide 22.
2. A rising central cam section 21a.
3. A less steeply rising cam end section 24.

Figure 13:
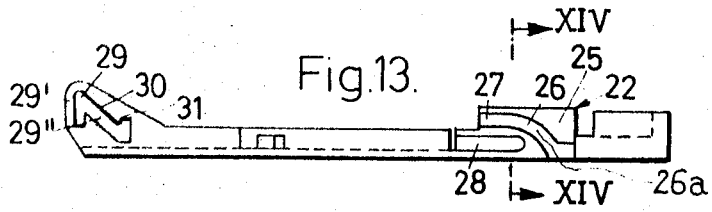
FIG. 13 is the side view of the slide mechanism.
Figure 14:
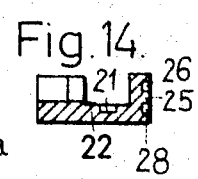
FIG. 14 is a section along the line XIV–XIV of FIG. 13.

Control slide 22 as shown may consist of two parts 22' and 22" but also can be made of one piece. The following further details are shown in FIGS. 13, 14, 15:

Front side 25 of control slide 22 positioned at right angles to the optical axis and thereby arranged at right angle to cam 21 (FIG. 14), having a cam 26 consisting of two sections thereon (FIG. 13):

1. A straight line cam section 27.
2. A circular cam section 26a.

Figures 16, 17:
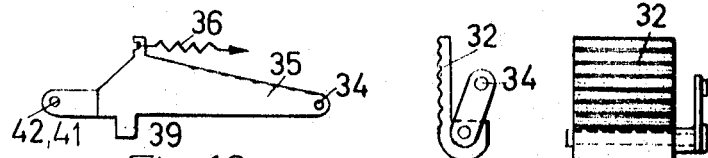
FIG. 16 is the side view of the releasing rod.
FIG. 17 is a side view of the releasing key.
Figure 18:
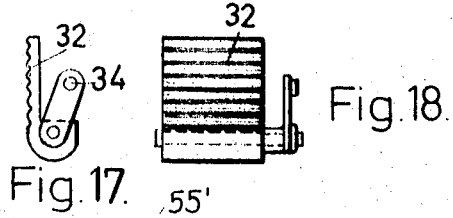
FIG. 18 is a plan view of the releasing key shown in FIG. 17.

Furthermore front side 25 of control slide 22 has a guide groove 28. At the other end control slide 22 has an essentially Z-shaped recess 29 which has a guiding slope 30 with a catch nose 31 (FIG. 13) (the wall portion 29" may be omitted so that a triangular recess results). The common release key 32 for actuating of support 6 of objective 8 and of the exposure release is pivoted at 33 of camera housing 1 (FIG. 2) and is connected with release-rod 35 (FIGS. 2 and 16) by arm 33' at point 34 and further a pin 41, latching behind catch nose 31 with control slide 22. A tension spring 36 is suspended at a hook 37 of a plate 38 and a hook 36' of the release rod 35. Spring 36 tends through release rod 35 to swing release key 32 out of the surface 1' of camera 1, with which it is flush in the rest position, into position 32'.

An extension 39 of releasing rod 35 actuates the shutter release not shown in drawing.

Plate 38 furthermore has an U-shaped guide slot 40 (FIGS. 2, 2a, 2b), in which a pin 41 is movable, the latter being riveted at the point 42 (FIG. 16) on releasing rod 35. Rivet pin 41 passing through triangular recess 29 of control slide 22 engages U-shaped guide slot 40 of plate 38.

Control slide 22 is moved by a tension spring 43 (FIGS. 15, 2, 2a, 2b). In the groove 28 of the control slide a projection of a pin 44 (FIGS. 2 and 3) riveted in a support plate 45 and having an extension 46 (FIG. 3) pivoted in the front plate 47 of camera 1 is located.

Support plate 45 is fastened by a screw 48 and pin 49 whereby pin 49 is fixed to the camera housing 1. At the other end of support plate 45, pin 44, connecting support plate 45 and rocker arm 50, forms the pivot for rocker arm 50. Rocker arm 50 is rotated about pivot 44 by a pin 51 which is fixed on rocker arm 50, engaging cam 26 on cam slide 25. Rocker arm 50 is moved into the dotted position 50' by radial cam section 26a when control slide 22 is moved to the right (FIG. 2).

Figure 19:
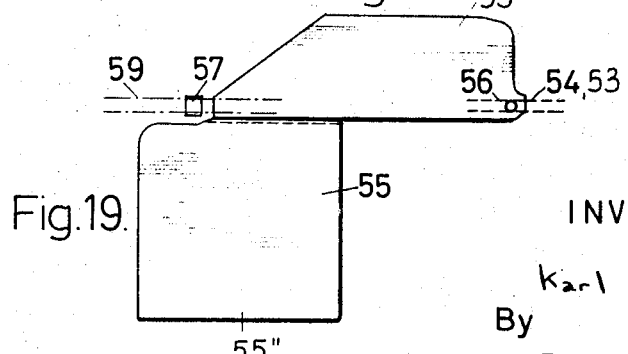
FIG. 19 is a front view of the cover slide.

Rocker arm 50 has on the other end 52' thereof a guide slot 52 into which the projection 53 of a guide 54 protrudes. Pin 54 is fastened to the angle-shaped cover slide 55. The angle-form of cover slide 55 provides that on the one hand reaches with a leg 55' (FIGS. 19 and 2) close to the end 52' of rocker arm 50 and to guide slot 52 and on the other hand mutually may cover or uncover with the second leg 55'' rectangular opening 2 for support 6 of objective 8 and simultaneously with leg 55' also the opening 58 for the viewfinder and photoelectric cell both not shown in the drawing. Cover slide 55 is guided by a pin 54 in a groove 56 (FIGS. 2 and 19) of front plate 47 of camera 1.

A second guide is formed by a flange 57 bent out of the cover slide 55 and sliding in a further guide groove 59 of front plate 47 of camera 1 (FIG. 2). The recesses 60 and 61 of plate 47 of camera 1 (FIG. 1) serve as guide grooves for cover slide 55 and prevent the latter from dropping out.

The function of the device is as follows:

When the camera is not in use, support 6 of objective 8 and tube 4 is shifted into the camera housing 1 and is protected by cover slide 55 and is invisible from the outside. Release key 32 is flush with the camera surface 1' so that the whole camera forms a flat rectangular prism.

Figure 7:
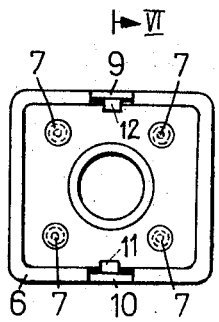
FIG. 7 is the front view of the support for the objective.

When an exposure shall be made, first the release key 32 is pressed somewhat down, whereby the release rod 35 is actuated, which simultaneously is moving downward with pins 41 in the left leg 40'' of the U-shaped guide slot 40 of plate 38. This movement is limited by the end of leg 40''. By this downward movement of the release rod 35, pin 41 advances from behind catch nose 31 of Z-shaped recess 29 of control slide 22. Thereby control slide 22 is released and moves under influence of tension spring 43 in longitudinal direction to the right (FIG. 2a) until, with edge 29' of Z-shaped recess 29 positioned at right angle to the direction of movement, it is stopped by pin 41 which is guided in left leg 40'' of U-shaped guide slot 40 of plate 38. By this movement of control slide 22, cam 26 connected therewith is shifted to the right (FIG. 2) and by pin 51 of rocker arm 50 engaging in circular cam section 26a rotates arm 50 about pivot 44 into the dotted position 50'. Rocker arm 50 shifts with its other end 52' by means of guide slot 52 and pin 54 of cover slide 55 the latter 55 which thereby uncovers opening 2 for support 6 of objective 8. Subsequently by further movement of rocker arm 50 the positions 50' of rocker arm 50 and of cover slide 55 remain unchanged on account of straight line cam section 27 of cam 26. By this movement of control slide 22 rocker 15 of tube 4 is rotated downward about pivot 18 by cam 21 and pin 20 (FIGS. 11, 12 fastened at point 19. In recesses 17 of tubus rocker arms 16 of tube 4 (FIGS. 11, 12) the guide pins 11, 12 (FIGS. 6, 7, 1) of support 6 of objective 8 are placed. By rotating rocker 15 of tube 4 about pivot 19, support 6 of objective 8 including tube 4 by rocking arms 16 is shifted in the direction of the operative position (FIG. 1) which at first is not fully reached. By first unlocking release key 32 the release rod 35 with pin 41 moves upwards under influence of spring 36 within the left leg 40'' of the U-shaped guide slot 40 of plate 38 (FIG. 2a). In the area of slope 40''' of the center nose of U-shaped guide slot 40 the release rod 35, pivotable about link point 34 by pin 41 is pulled to the right over edge 29' of the Z-shaped recess 29 of control slide 22 under tension of spring 43 (FIG. 2b), until pin 41 abuts against edge of the right leg 40'''' of U-shaped guide slot 40. Thereby extension 39 (FIG. 2) is rocked into the area of the exposure release mechanism not shown in the drawing.

Simultaneously support 6 of objective 8 is brought into the end position thereof by cam section 24 of cam 21 by pin 20. Release key 32 is now swung out from its rest position on the camera surface 1' into the operative position 32'. The operation key 22'' of control slide 22 protrudes now horizontally through a corresponding opening (FIG. 2) over the side of the camera.

The latter now is ready for exposure.

When en exposure shall be made, release key 32 swung out and being in readiness-position 32' is pressed down, whereby pin 41 under influence of spring 43 over edge 29' of Z-shaped recess 29 moves only downward in right leg 40'''' of U-shaped guide slot 40 (FIG. 2b). The movement is limited by the length of the right leg 40'''', which is somewhat shorter than left leg 40'', so that release key 32 is movable only close to the camera surface-level 1''. In this close position of release key 32 release rod 35 with its nose 39 is in a position 39' in which the nose 39 is in the area of the release mechanism (not shown in the drawing) so that the latter by pressing down release key 32 is actuated.

By unlocking the release key 32, pin 41 under influence of spring 36 returns upwards up to abutment 40' of U-shaped recess 40 (FIG. 2b), but remains under influence of spring 43 over edge 29' of Z-shaped recess 29 by further actuation of release key 32 in the area of the inner or right-leg 40'''' of U-shaped recess 40.

Therefore the exposure release may be repeated at will, without changing in any manner the operative position of objective 8 support 6.

When the camera shall be put into the state of being not in use then control slide 22 is operated at pression key 22' protruding over the camera and is pushed back into the camera housing 1 (FIG. 2). By this movement at first support 6 of objective 8 is shifted back by cam sections 24 and 21a of cam 21 by pin 20 and rocker 15 of tube 5, while subsequently a further influence on the support of the objective is not effective by virtue of straight-line section 23 of curve 21. Instead thereof now cam 26 on front side 25 of slide 22 (FIGS. 2, 13) becomes effective for rocker 50, and rotates the latter about pivot 44 by pin 51.

Simultaneously rocker 50 having guide slot 52 at its other end 52' moves the cover slide 55 in its guides 56 and 59 by pin 53, 54 in front of openings 2 and 58 of the front plate 47 of camera 1 (FIG. 2).

During the movement of control slide 22 through slope 30 of Z-shaped recess 29 simultaneously rivet pin 41 of release rod 35, being under influence of spring 36, at first is shifted along abutment 40' of U-shaped recess 40 (FIG. 2b) into the area of the left leg 40'' and up to the abutment of the edge 40a of left leg 40''. Thereby pin 41 is shifted downward by overcoming force of the tension spring 36 and over guide slope 30 along edge 40a of left leg 40'' so far that it latches behind catch nose 31 of guide slope 30 (FIG. 2). By this movement of release rod 35 also release key 32 is retracted from its outwardly swung position 32' until it becomes flush with camera surface 1'. Simultaneously release 35 is removed from the influence area of the camera release mechanism (not shown). Thereby the camera is again in the state of not being used and may be brought anew into the active state in the above-mentioned manner.

I claim:

1. A camera having a housing, an objective, and a movable support for said objective, said support being attached to a tube, said tube carrying said support, said tube and said support being movable along the optical axis of the objective from a nonuse state of said camera to an operative state thereof, said camera comprising a slidable cover slide for protecting said objective in said state of nonuse of said camera, said cover slide being slidable in a plane at right angle to said optical axis from said nonuse state to said operative state of said camera, a slidable control slide movable in a plane at right angle to said optical axis; two guide cams disposed on said control slide; first and second means for moving said tube carrying said support and said cover slide, respectively; guide pin means on said first and second means, said pin means operatively engaging said guide cams, respectively; and said guide cams having section of different inclinations providing movements of said tube and of said cover slide in timed relationship relative to one another.

2. A camera according to claim 1, said support carried by said tube comprising resilient flanges and said guide pins being moulded from highly impact-resistant tough plastics.

3. A camera according to claim 1 further comprising a spring moving said control slide from a first position in which said camera is in said nonuse state to a second position in which said camera is in said operative state, resting means on said control slide, an exposure release key and a member connected with said exposure release key of said camera, said member engaging said resting means for locking said control slide in said state of nonuse of said camera.

4. A camera according to claim 3, said control slide comprising an operation key disposed for protruding outwardly of said housing of said camera in said operative state of said camera, said key disposed further for moving said control slide for returning said tube carrying said support of said objective to said nonuse state of said camera.

5. A camera according to claim 3, said first means consisting of a rocker, a pair of arms extending from said rocker, said arms engaging said tube, said pin means on said rocker disposed to engage one of said two guide cams of said control slide, the movement of said control slide being transmitted to said tube by said rocker operated by said one of said two guide cams and said pin means.

6. A camera according to claim 3, said second means consisting of a rocker arm pivotally mounted in said housing of said camera, said pin means on said rocker arm disposed for engaging the other one of said two guide cams on said control slide for transmitting the movement of said control slide to said rocker arm, connecting means on said rocker arm for connecting the latter operatively with said cover slide, and said sections of different inclinations on said other one of said guide cams providing for a first movement to release the opening for said tube and support of said objective and for a subsequent second movement of said tube and support itself while the position of said release of said opening as obtained by said first movement remains unchanged.

7. A camera according to claim 6, and a release rod pivotally connected with said exposure release key, said release rod having a free end, a pin on said free end, said control slide having a substantially triangular opening, a fixed plate in said housing of said camera, said plate having a substantially U-shaped guide recess, said pin engaging said recess through said triangular opening, a spring on aid release rod for urging said release key into an open position, said U-shaped recess having an outer and an inner U-leg, said pin driven by said triangular opening being shifted by the movement of said control slide within said U-shaped recess for disengaging said release rod from the exposure release mechanism, engaging said outer U-leg for attaining a rest position, said pin being disposed for continuing the movement thereof in said outer U-leg upon actuation of said release key for releasing said control slide, operating said cover slide and said tube with said support, further moving through said U-shaped recess by one side of said triangular opening in said control slide into said inner U-leg for permitting exposure releases by said release key without changing positions of said control slide and of said tube with said support of said objective.